United States Patent
Kume

(10) Patent No.: US 9,618,928 B2
(45) Date of Patent: Apr. 11, 2017

(54) SIMULATION APPARATUS OF NUMERICAL CONTROLLER

(71) Applicant: FANUC Corporation, Minamitsuru-gun, Yamanashi (JP)

(72) Inventor: Ryousuke Kume, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 568 days.

(21) Appl. No.: 13/914,700

(22) Filed: Jun. 11, 2013

(65) Prior Publication Data

US 2013/0338809 A1    Dec. 19, 2013

(30) Foreign Application Priority Data

Jun. 13, 2012 (JP) ................................. 2012-133991
Apr. 24, 2013 (JP) ................................. 2013-091718

(51) Int. Cl.
*G06F 19/00* (2011.01)
*G05B 19/4155* (2006.01)
*G05B 19/4069* (2006.01)

(52) U.S. Cl.
CPC ..... *G05B 19/4155* (2013.01); *G05B 19/4069* (2013.01); *G05B 2219/35336* (2013.01);
(Continued)

(58) Field of Classification Search
CPC ............ G05B 19/4155; G05B 19/4069; G05B 2219/35336; G05B 2219/35342; G05B 2219/35338
(Continued)

(56) References Cited

U.S. PATENT DOCUMENTS 4,484,286 A * 11/1984 Nagamine ............ G05B 19/414
                                                    700/181
4,772,206 A *  9/1988 Kerr ...................... G06F 17/246
                                                    434/118
(Continued)

FOREIGN PATENT DOCUMENTS

CN          101334657          12/2008
DE          197 39 559 A1       3/1999
(Continued)

OTHER PUBLICATIONS

Office Action issued Dec. 10, 2014 in German Patent Application No. 10 2013 009 520.4 (18 pages) with English Translation (7 pages).
(Continued)

*Primary Examiner* — Ziaul Karim
(74) *Attorney, Agent, or Firm* — Drinker Biddle & Reath LLP

(57) ABSTRACT

A simulation apparatus of a numerical controller that controls a movable unit of a machine tool on the basis of a machining program sequentially generates, when the machining program includes a machining cycle command, a series of movement commands from designated work shape data and machining conditions, and stores the movement commands in a memory. The simulation apparatus displays the machining program and a moving image of the machining program in first and second areas of a display screen and displays the movement commands generated from the machining cycle command in a third area of the display screen.

2 Claims, 14 Drawing Sheets

(52) U.S. Cl.
CPC .............. *G05B 2219/35338* (2013.01); *G05B 2219/35342* (2013.01)

(58) Field of Classification Search
USPC .......................................................... 700/97
See application file for complete search history.

(56) References Cited

U.S. PATENT DOCUMENTS

| | | | | |
|---|---|---|---|---|
| 5,337,249 | A * | 8/1994 | Fujita ................. | G05B 19/4069 700/180 |
| 6,546,127 | B1 * | 4/2003 | Seong ................. | G05B 19/4069 318/599 |
| 6,889,114 | B2 | 5/2005 | Nakamura | |
| 2009/0265030 | A1 * | 10/2009 | Huang ............... | G05B 19/4068 700/182 |
| 2013/0096700 | A1 * | 4/2013 | Tezuka ................ | G05B 19/408 700/83 |

FOREIGN PATENT DOCUMENTS

| | | |
|---|---|---|
| JP | 62-121515 A | 6/1987 |
| JP | 01-250109 A | 10/1989 |
| JP | 07-129540 A | 5/1995 |
| JP | 09-44208 A | 2/1997 |
| JP | 11-119818 A | 4/1999 |
| JP | 2002-126975 | 5/2002 |
| JP | 2006-068901 A | 3/2006 |
| JP | 2006068901 * | 3/2006 |
| JP | 2011-022666 A | 2/2011 |

OTHER PUBLICATIONS

DataPilot 4110, CNC—Programmierung und Ausbildung Auf dem PC, Heidenhain, Product Brochure, Sep. 2005, 7 pages.

Baudisch, "Simulationsumgebung zur Auslegung der Bewgungsdynamik des mechatronischen Systems Werkzeugmaschine," Ph.D. Dissertation, 2003, 203 pages, Publisher Herbert Utz, Munich 2003.

Siemens Sinumerik 840D/810D/FM-NC, Bedienungsanleitung (User's Manual), Ausgabe (issue) 10.2000, pp. 0-1 to 0-12, and pp. 6-283 to 6-333 (59 pages).

* cited by examiner

```
%
O1000                              ←MACHINING PROGRAM NAME
G1900D50.L100.K0.                     ← WORK INFORMATION
T1                                    ← TOOL INFORMATION
S500    ← MAIN SPINDLE REVOLUTION NUMBER INFORMATION
```

G1120P1.Q0.2H100.F100.E100.V100.K ⎫ MACHINING
100.W1.U2.L0.5M0.5Z10.S3.N1.      ⎬ COMMAND
G1450H0.V0.A0.                    ⎭ (CUTTING CONDITION)
G1451H-20.V0.K5.C-20.L0.M0.T2.    ⎫
G1451H-20.V10.K3.D10.L0.M0.T1.    ⎪
G1451H-30.V10.K5.C-30.L0.M0.T1.   ⎬ WORK SHAPE      ⎫ MACHINING
G1451H-30.V25.K3.D25.L0.M0.T1.    ⎪ COMMAND         ⎬ CYCLE
G1451H0.V25.K1.C0.L0.M0.T2.       ⎪ (SHAPE          ⎭ COMMAND
G1451H0.V0.K7.D0.L0.M0.T2         ⎭ DEFINITION)
G1456
M30
%

SIMULATION APPARATUS OF NUMERICAL CONTROLLER

RELATED APPLICATION DATA

This application claims priority under 35 U.S.C. §119 and/or §365 to Japanese Application No. 2012-133991 filed Jun. 13, 2012, and Japanese Application No. 2013-091718 filed Apr. 24, 2013, the entire contents of both are incorporated herein by reference.

BACKGROUND OF THE INVENTION

1. Field of the Invention

The present invention relates to a simulation apparatus of a numerical controller.

2. Description of the Related Art

When creating a program for machining a workpiece, an operator needs to calculate a start point and an end point of a moving path of a tool and create a movement command block by block. One block is one command unit forming a machining program. A machining cycle command is included in a command used for the machining program. The machining cycle command is one command adapted to perform a series of movement commands including a plurality of blocks. The machining cycle command defines a work shape and machining conditions. A numerical controller for controlling a machine tool generates a plurality of movement commands from the work shape and the machining conditions defined by the machining cycle command described in the machining program and controls a movable axis. The operator can easily create a program for machining a workpiece by using the machining cycle command.

FIG. 1 is an example of a machining program for explaining an actual machining cycle command (turning cycle). FIG. 2 is a diagram for explaining a machining command (turning conditions). FIG. 3 is a diagram for explaining a work shape command (a shape definition).

In a machining program example with a machining program name "O1000", work information described as "G1900D50.L100.K0", tool information described as "T1", main spindle revolution number information described as "S500", and a machining cycle command are described. In a machining command for designating 'cutting condition' of the machining cycle command, respective items are designated as shown in FIG. 2. On the other hand, in a work shape command for defining "work shape" to be cut and machined, a shape is defined on an XZ plane as shown in FIG. 3. In the machining cycle command, as shown in FIG. 4, (a) first, a movement command 50 for cutting a cutting area is generated and executed, (b) next, a movement command 51 for allowing a tool to escape from a cutting end position in (a) is generated and executed, (c) next, a movement command 52 for moving the tool from an end position in (b) to a cutting start position is generated and executed, and (d) (a) to (c) are repeated and a process for cutting the cutting area is repeated until machining of the cutting area ends.

Conventionally, before actual machining, in a numerical controller or a simulation apparatus, a simulation of the machining is performed on the basis of a machining program. A material shape, a chuck shape, and a tool shape are displayed on a screen of a image displaying device included in the numerical controller or the simulation apparatus and a state of a material being cut and a tool track are graphically displayed (simulation-rendered), whereby it is possible to check a machining operation indicated by the machining program prior to actual machining of work (see, Japanese Patent Application Laid-Open No. 2011-22666).

When a simulation of a machining program including a machining cycle command is executed by the simulation apparatus, the machining cycle command is converted into a plurality of movement commands and executed. FIG. 5 is a diagram for explaining that, when the simulation of the machining program including the machining cycle command is executed, the machining cycle command is converted (expanded) into a plurality of movement commands.

A machining program 10 includes a plurality of movement commands indicated by a movement command (a) 11 and a movement command (b) 13 and a machining cycle command 12 in which a work shape and machining conditions are commanded. When a simulation of the machining program 10 is performed by the simulation apparatus, a converted machining program 20 including a movement command (a) 21, a movement command (b) 23, and a plurality of movement commands ($22_1$, $22_2$, . . . , $22_n$) converted from the machining cycle command 12 is generated from the machining program 10.

As shown in FIG. 6, the machining cycle command 12 includes a command section 12a for cutting conditions and a command section 12b for a work shape. When a machining cycle command in a machining program is executed, first, a cutting area 6 (see FIG. 7) is calculated from argument data of a work shape command of the machining cycle command. FIG. 7 is a simulation image. A cutting area of work (a work shape 4) fixed to a chuck (a shuck shape 2) is machined using a tool (a tool shape 8).

Conventionally, as shown in FIG. 8, a moving image of a machining operation of a machining cycle command can be displayed by a simulation. However, there are problems explained below.

FIG. 8 is a diagram for explaining an example of a screen configuration displayed on an image displaying device included in a conventional simulation apparatus. A screen configuration 90 includes a first display area 101 and a second display area 102. The first display area 101 is an area for displaying a simulation (a tool track or an animation rendering). A moving image of a machining operation is displayed in the first display area 101. In the second display area 102, a machining program is displayed. In the second display area 102, a cursor 110 is displayed in a block being executed. A display color of the cursor 110 is different from a display color of display areas of the other blocks.

When a simulation of a machining program including a machining cycle command is performed by a publicly-known simulation apparatus, a movement command for cutting a calculated cutting area is generated for one block, the generated movement command is immediately executed, and movement of a tool and rendering of a machining operation are performed according to the movement command. After the machining operation is completed, the next movement command in the cutting area is generated and executed. Since the generated movement command is used for the movement of the tool and the rendering of the machining operation, the movement command is temporarily stored in a memory area. However, since information concerning a movement command generated next is overwritten on the memory area in which information concerning the last movement command is stored, the information concerning the last movement command is not stored. Therefore, a movement command in the past cannot be checked again. A movement command halfway in a machining cycle command cannot be designated either. When an operator desires to check only a machining operation halfway in the machining cycle command, since the movement command halfway in the machining cycle command cannot be designated, the operator has to execute the machining cycle command from the start and needs to perform a single block operation up to a target place.

SUMMARY OF THE INVENTION

Therefore, in view of the problems of the related art, it is an object of the present invention to provide a simulation apparatus of a numerical controller that displays a moving image of a machining operation of a machining program including a machining cycle command in which blocks (movement commands) included in the machining cycle command can be arbitrarily checked.

The present invention relates to a simulation apparatus of a numerical controller that controls a movable unit of a machine tool on the basis of a machining program. The machining program includes a machining cycle command for generating a series of movement commands from designated work shape data and machining conditions. The simulation apparatus includes an image displaying device, an execution unit configured to analyze the machining program and, when a command of the analyzed machining program is a machining cycle command, sequentially generate movement commands for the movable unit from the designated work shape data and machining conditions, a memory configured to store the series of movement commands generated by the execution unit, and a display unit configured to display a moving image of the machining program, the machining program, and the series of movement commands generated by the execution unit, in a first, second and third display area of the image displaying device, respectively. The simulation apparatus displays the series of movement commands generated by the execution unit in the third display area of the image displaying device, displays a moving image of a machining operation based on the movement commands generated by the execution unit in the first display area, and same time, stores the movement commands generated by the execution unit in the memory.

The simulation apparatus may further include an operation unit configured to designate at least any one of the series of movement commands displayed in the third display area of the image displaying device. The execution unit may invoke, from the memory, the movement command designated by the operation unit and following movement commands sequentially among the series of movement commands stored in the memory and execute the invoked movement commands.

The simulation apparatus may further include an operation unit configured to designate at least one of the series of movement commands displayed in the third display area of the image displaying device. The execution unit may stop, in a position of the movement command designated by the operation unit, the execution of the series of movement commands stored in the memory.

Since the present invention includes the configuration explained above, it is possible to provide a simulation apparatus of a numerical controller that displays a moving image of a machining operation of a machining program including a machining cycle command in which blocks (movement commands) included in the machining cycle command can be arbitrarily checked.

BRIEF DESCRIPTION OF THE DRAWINGS

The object and the characteristic explained above and other objects and characteristics of the present invention will be made apparent from the following explanation of an embodiment with reference to the accompanying drawings, wherein.

DESCRIPTION OF THE PREFERRED EMBODIMENTS

Figures 1, 3:
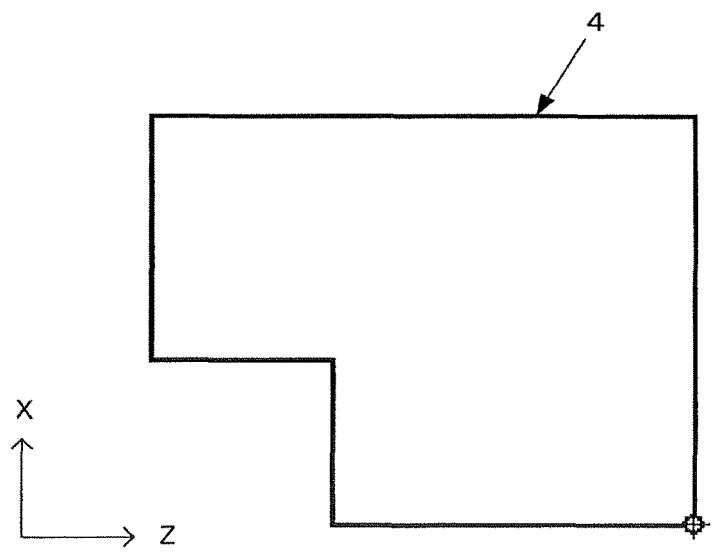
FIG. 1 is an example of a machining program for explaining an actual machining cycle command (a turning cycle)
FIG. 3 is a diagram for explaining a work shape command (a shape definition)
Figure 2:
FIG. 2 is a diagram for explaining a machining command (a turning condition)
Figure 4:
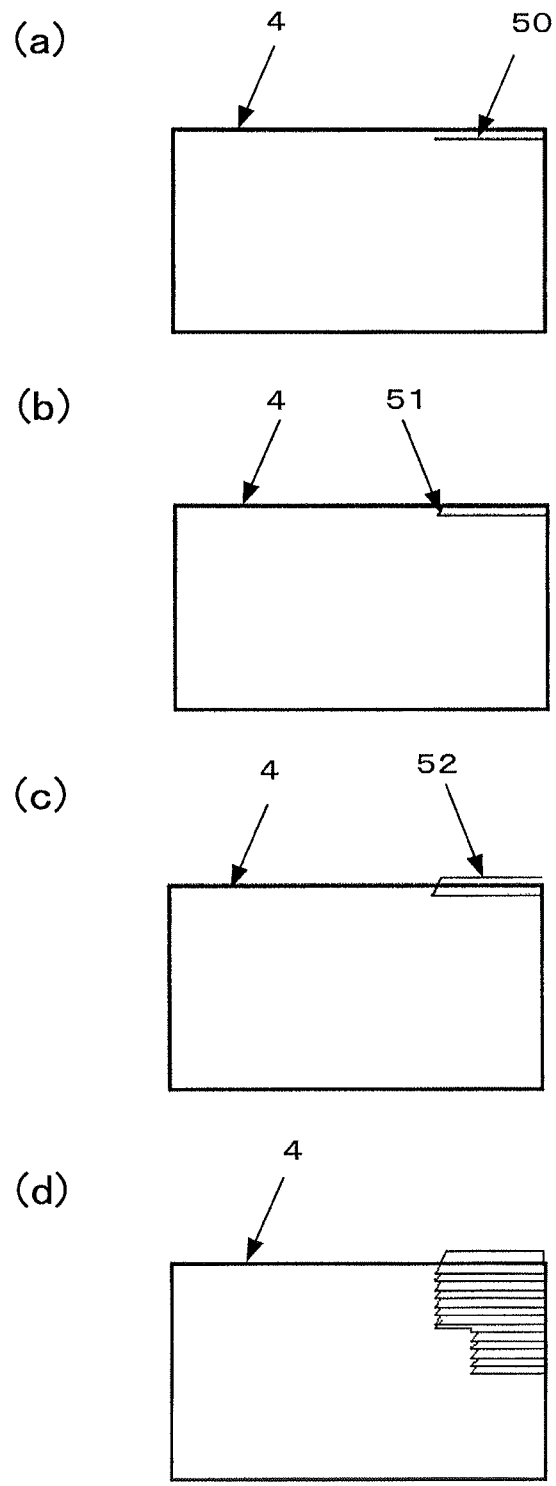
FIG. 4 is a diagram for explaining a flow of execution of a machining cycle command.
Figure 5:
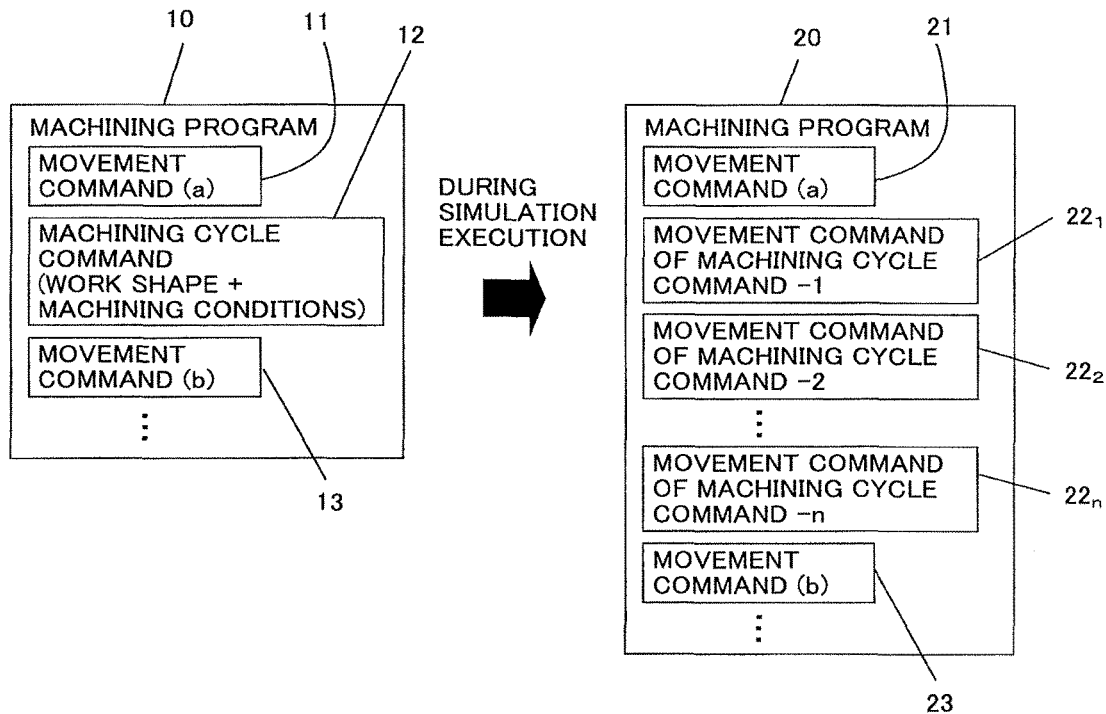
FIG. 5 is a diagram for explaining that the machining cycle command is converted into a plurality of movement commands when a simulation of a machining program including the machining cycle command is executed.
Figure 6:
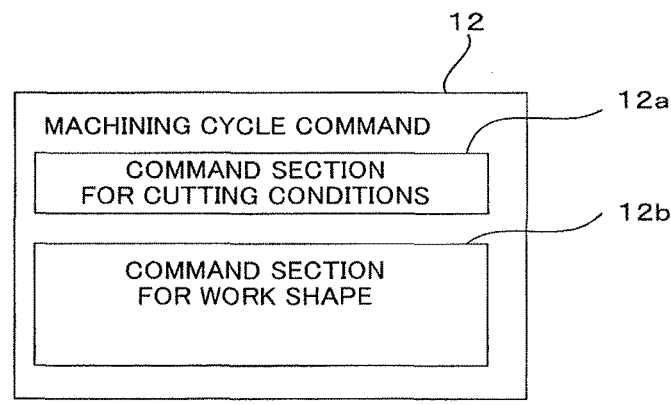
FIG. 6 is a diagram for explaining the machining cycle command.
Figure 7:
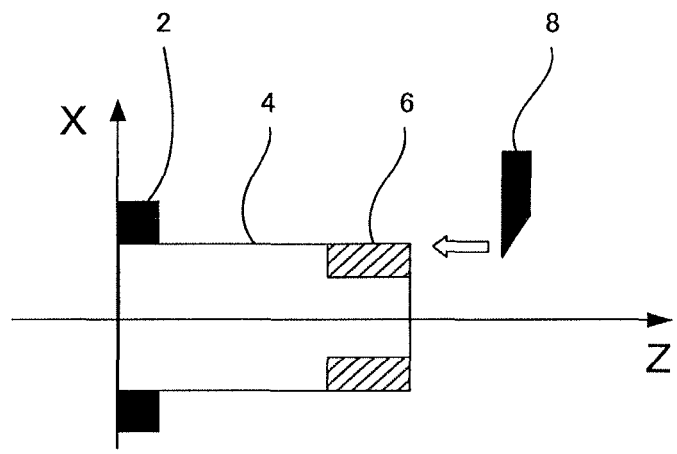
FIG. 7 is a diagram for explaining a cutting area designated by the machining cycle command.

The present invention provides a simulation apparatus of a numerical controller enabled to analyze a machining cycle command, store generated movement commands in a memory area, display the stored movement commands, and designate the displayed movement command in a unit of one block. The simulation apparatus can execute a simulation from a designated block in a stored program of a memory area or stop the simulation in a designated block and can execute the simulation again and stop the simulation within the machining cycle command.

A simulation apparatus of a numerical controller according to an embodiment of the present invention is explained with reference to FIG. 9.

A simulation apparatus 30 of a numerical controller includes an input unit 32 functioning as an interface for inputting a machining program 10, an execution unit 34 configured to perform arithmetic processing including a simulation for realizing the present invention, a memory 36 configured to store movement commands sequentially generated in the arithmetic processing of the execution unit 34, and a display unit 38 configured to display a result of the simulation on an image displaying device 37 included in the simulation apparatus 30.

Further, the simulation apparatus 30 includes an operation unit 39 including a start key for setting the simulation of the machining program in an execution state (i.e., for commanding a start of the simulation), a pause key for commanding a pause of a simulation state, a stop key for commanding a stop of the simulation state, a cursor moving key for commanding up and down movement of a cursor displayed in a third area explained below, a setting key for commanding a block number of a cursor position to be stored in the memory 36 as a stop block number, and a setting soft key for commanding the block number of the cursor position to be stored in the memory 36 as a resumption bock number.

The simulation apparatus 30 includes a program for executing processing shown in flowcharts of FIGS. 11A to 12C. According to the program, it is possible to designate at least work shape data and machining conditions, analyze a machining program including a machining cycle command for generating a series of movement commands from the designated work shape and the designated machining conditions, sequentially generate movement commands for the movable unit from the work shape data and the machining conditions when a command of the analyzed machining program is a machining cycle command, and store the generated movement commands in the memory, display the machining program, display a moving image of the machining program, and display the movement commands included in the machining cycle command.

The simulation apparatus 30 is realized by, for example, a personal computer (not shown in the figure) having an image processing function. Alternatively, the simulation apparatus 30 may be configured by a numerical controller (not shown in the figure) incorporating a computer that controls a machine tool.

Figure 9:
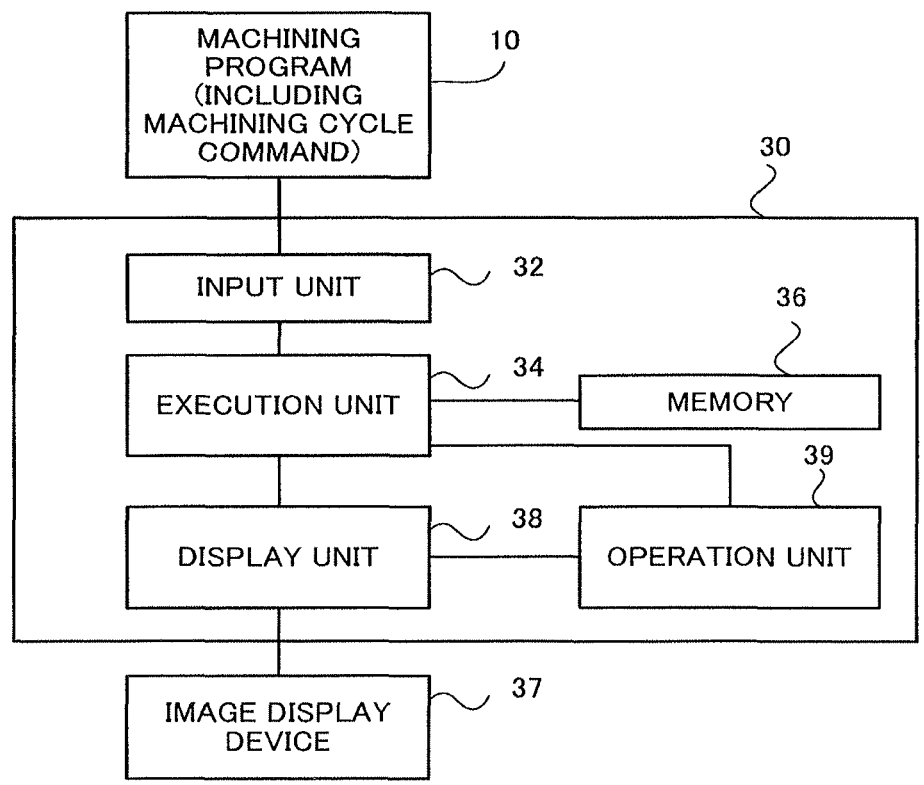
FIG. 9 is a diagram for explaining a simulation apparatus according to an embodiment of the present invention.
Figure 8:
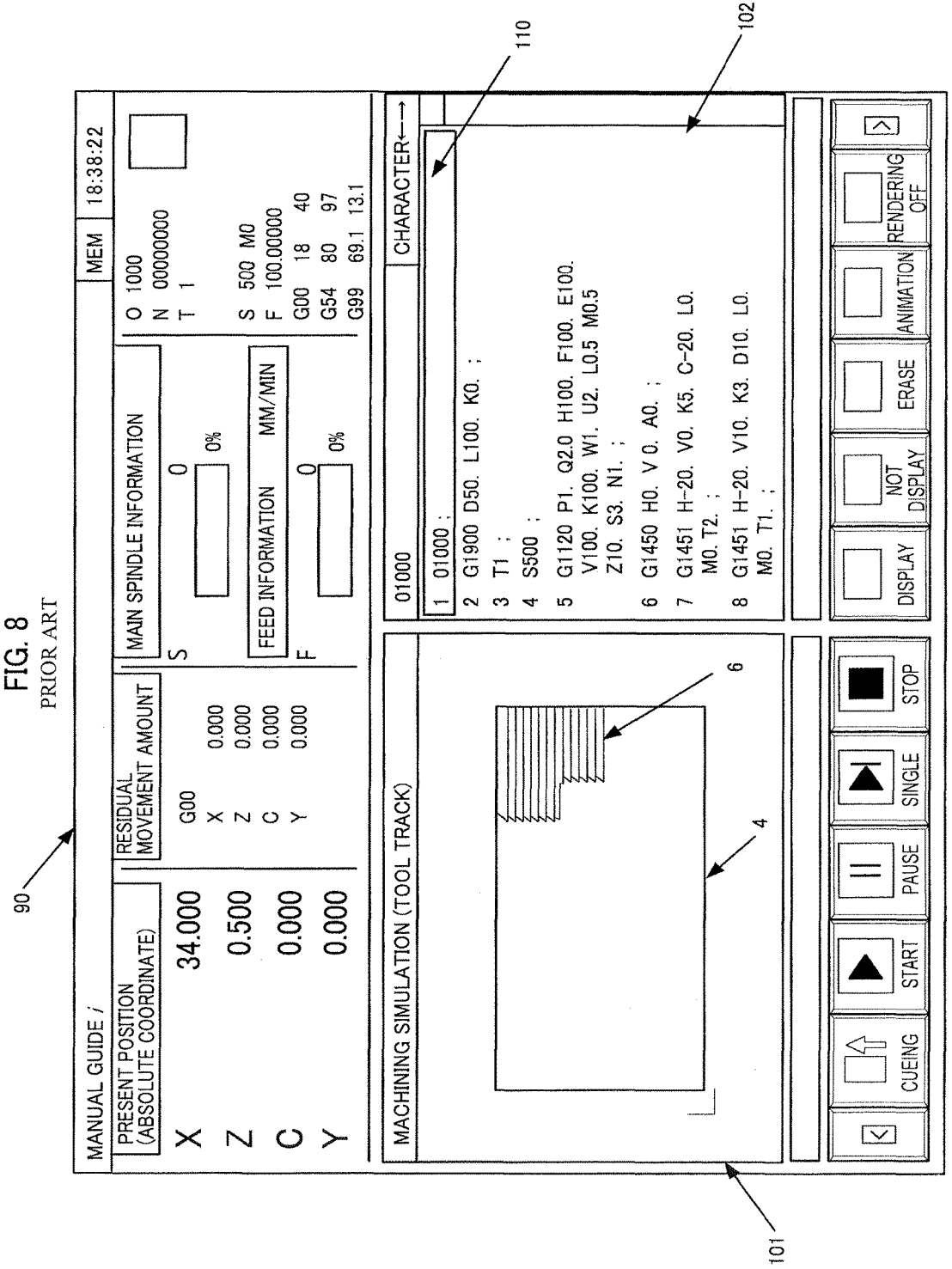
FIG. 8 is a diagram for explaining a screen configuration included in a simulation apparatus according to the related art.
Figure 10:
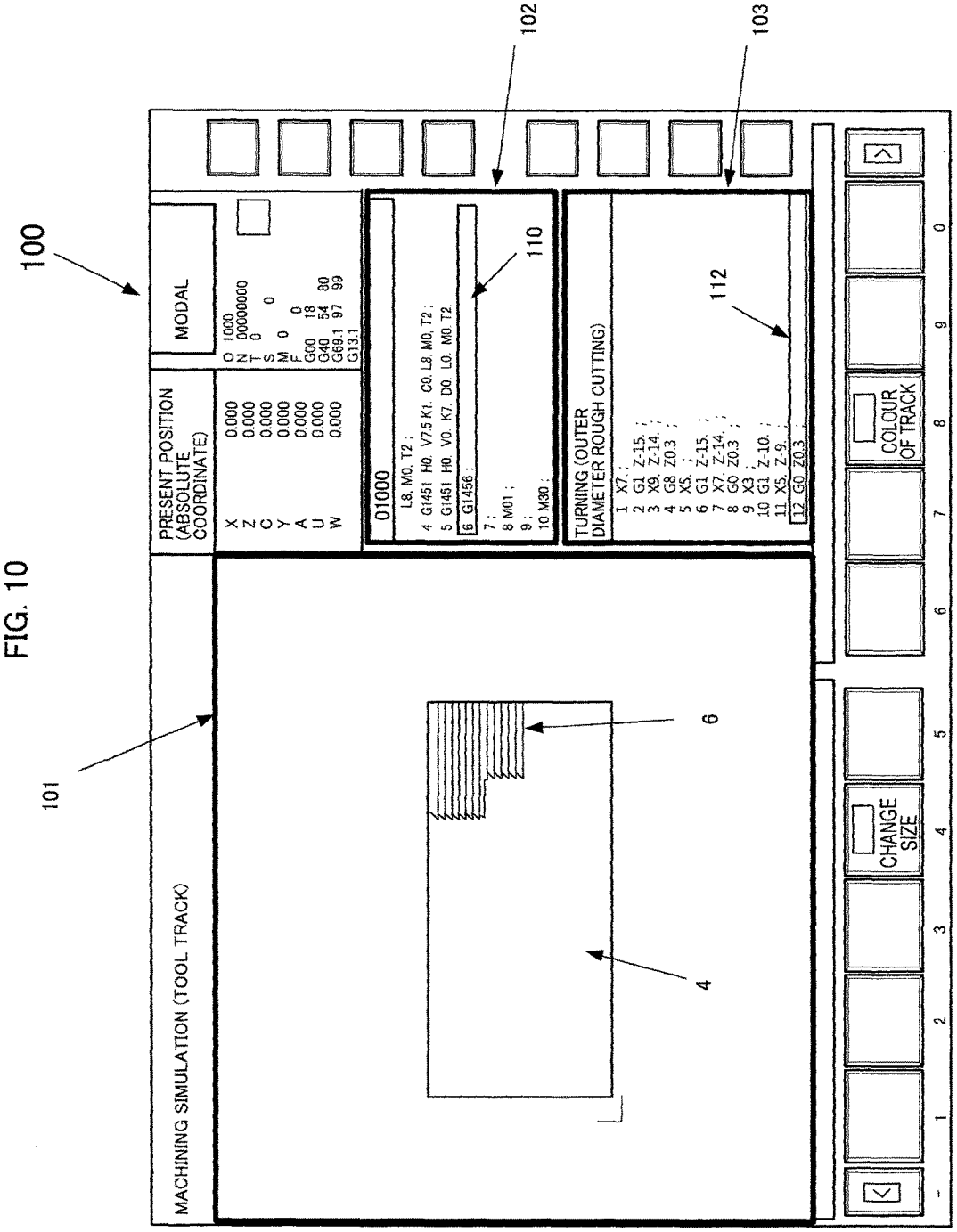
FIG. 10 is a diagram for explaining a screen configuration included in the simulation apparatus shown in FIG. 9.

FIG. 10 is a diagram for explaining a screen configuration included in the display unit 38 of the simulation apparatus 30 shown in FIG. 9.

A screen configuration 100 includes a first display area 101, a second display area 102, and a third display area 103. The first display area 101 is an area for displaying a moving image of a machining operation. In the first display area 101, a work shape 4 whose shape is defined by a machining cycle command is displayed. Tool tracks of movement commands generated according to the machining cycle command are displayed in a cutting area 6. A machining program including the machining cycle command is displayed in the second display area 102. One or more blocks (expanded blocks) generated from the machining cycle command by a simulation and included in the machining cycle command are displayed in the third display area 103. In the second display area 102 and the third display area 103, cursors 110 and 112 are respectively displayed in blocks being executed. The display colors of these cursors 110 and 112 are different from the display colors of the other blocks.

Processing executed by the simulation apparatus 30 according to the present invention is explained with reference to the flowcharts of FIGS. 11A to 12C. When the processing shown in the flowcharts is executed, items shown in FIG. 14 are stored in the memory 36 (see FIG. 9) of the simulation apparatus 30. Further, function keys for commanding a simulation state and moving a cursor are provided in the simulation apparatus 30 as input interfaces of the operation unit 39 (see FIG. 9). For example, as shown in FIG. 13, a function key F1 is allocated as a simulation start key, a function key F2 is allocated as a simulation pause key, a function key F3 is allocated as a simulation stop key, a function key F4 is allocated as a setting key for a stop block number, a function key F5 is allocated as a setting key for a resumption block number, a function key F6 is a cursor moving key for moving the cursor in the upward direction, and a function key F7 is allocated as a cursor moving key for moving the cursor in the downward direction.

Figure 11A:
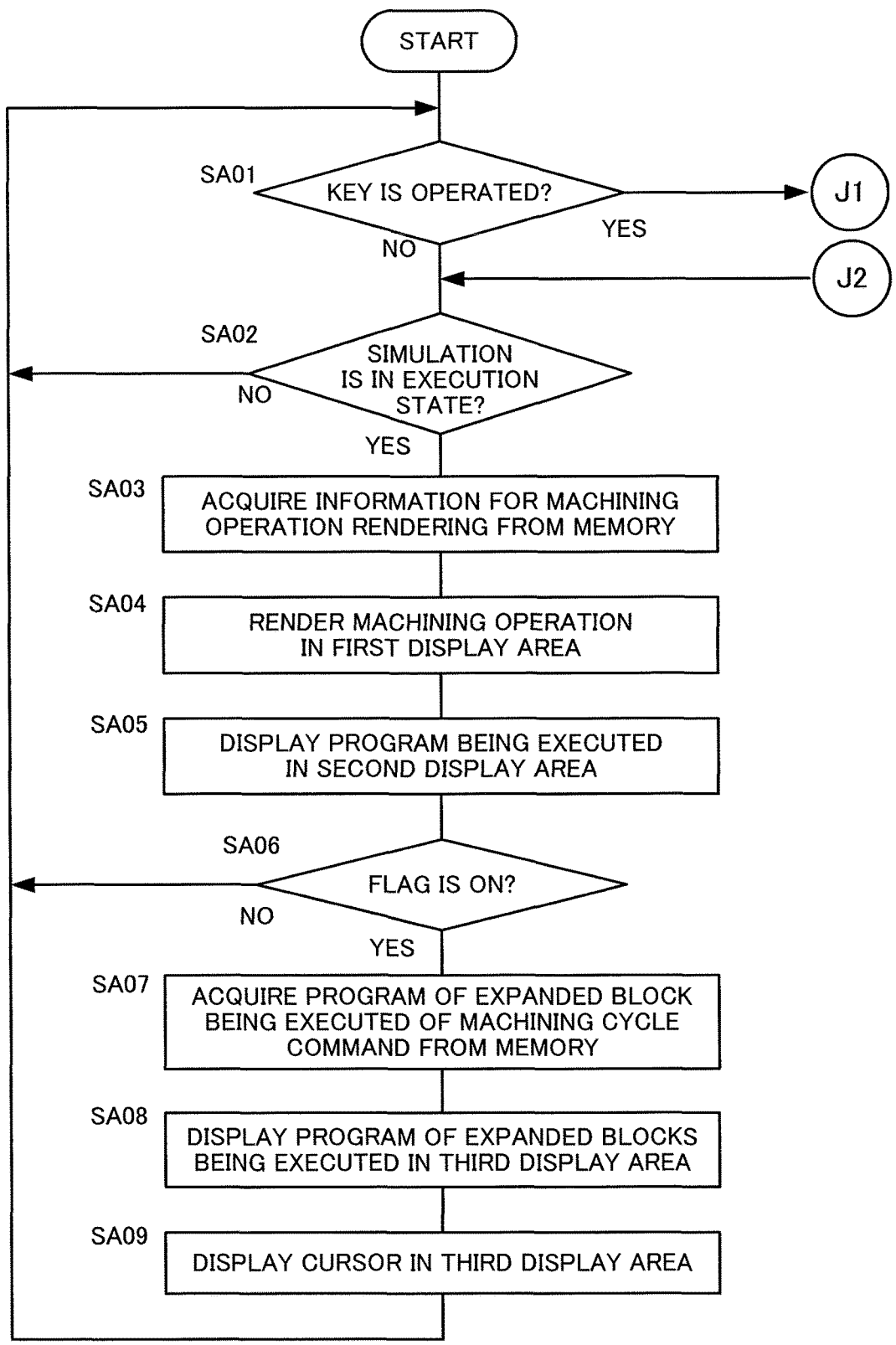
FIGS. 11A and 11B are flowcharts for explaining processing executed by an operation unit and a display unit included in the simulation apparatus shown in FIG. 9.
Figure 11B:
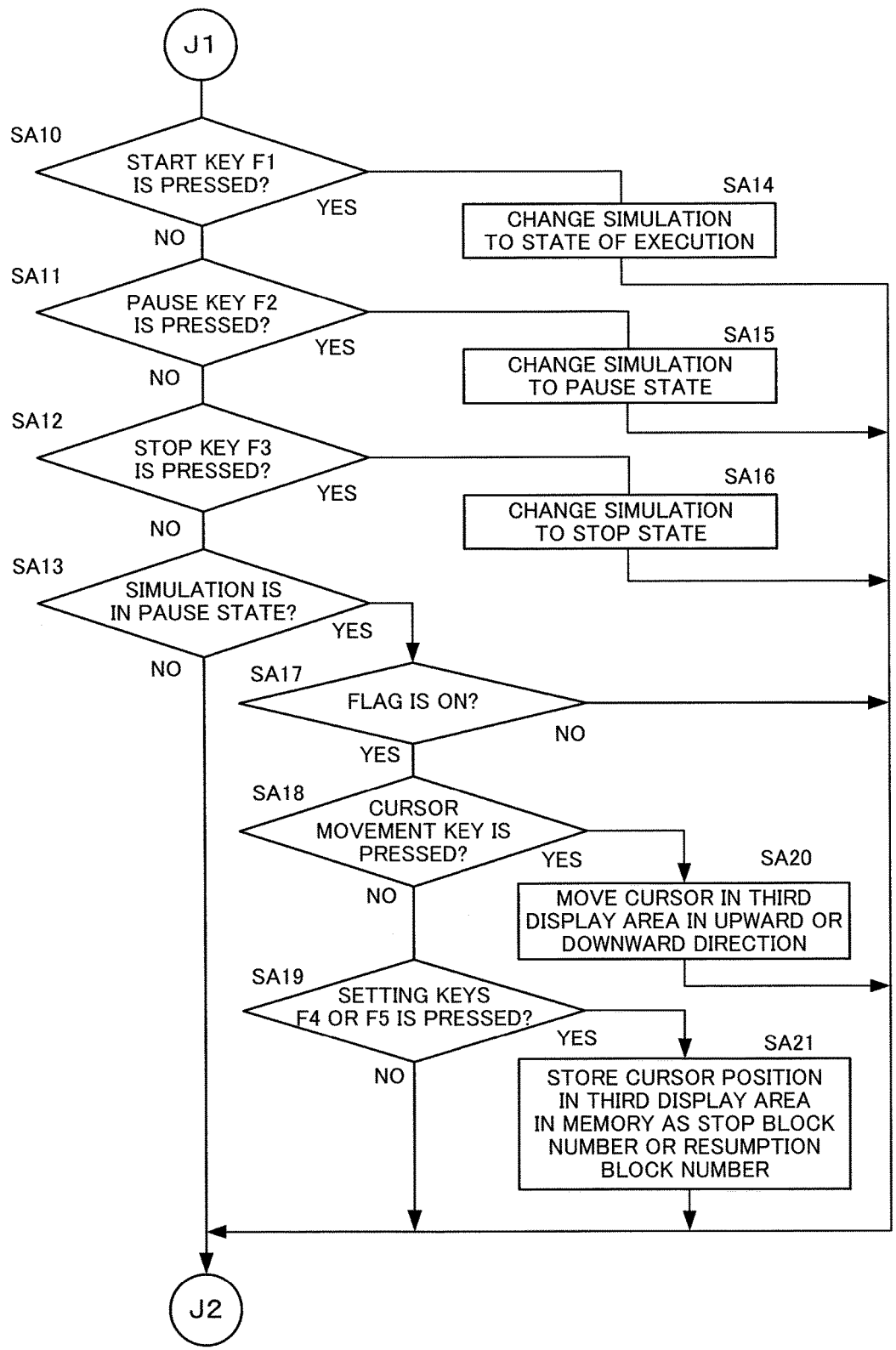
Figure 13:
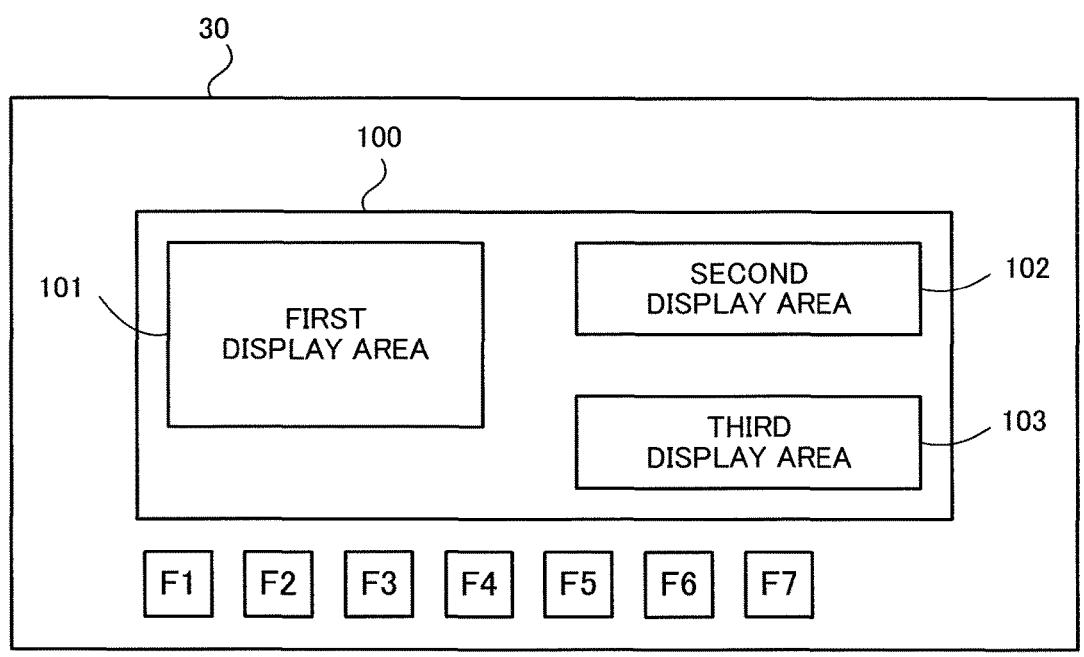
FIG. 13 is a diagram for explaining a display area displayed in processing shown in the flowcharts of FIGS. 11A and 11B.
Figure 14:
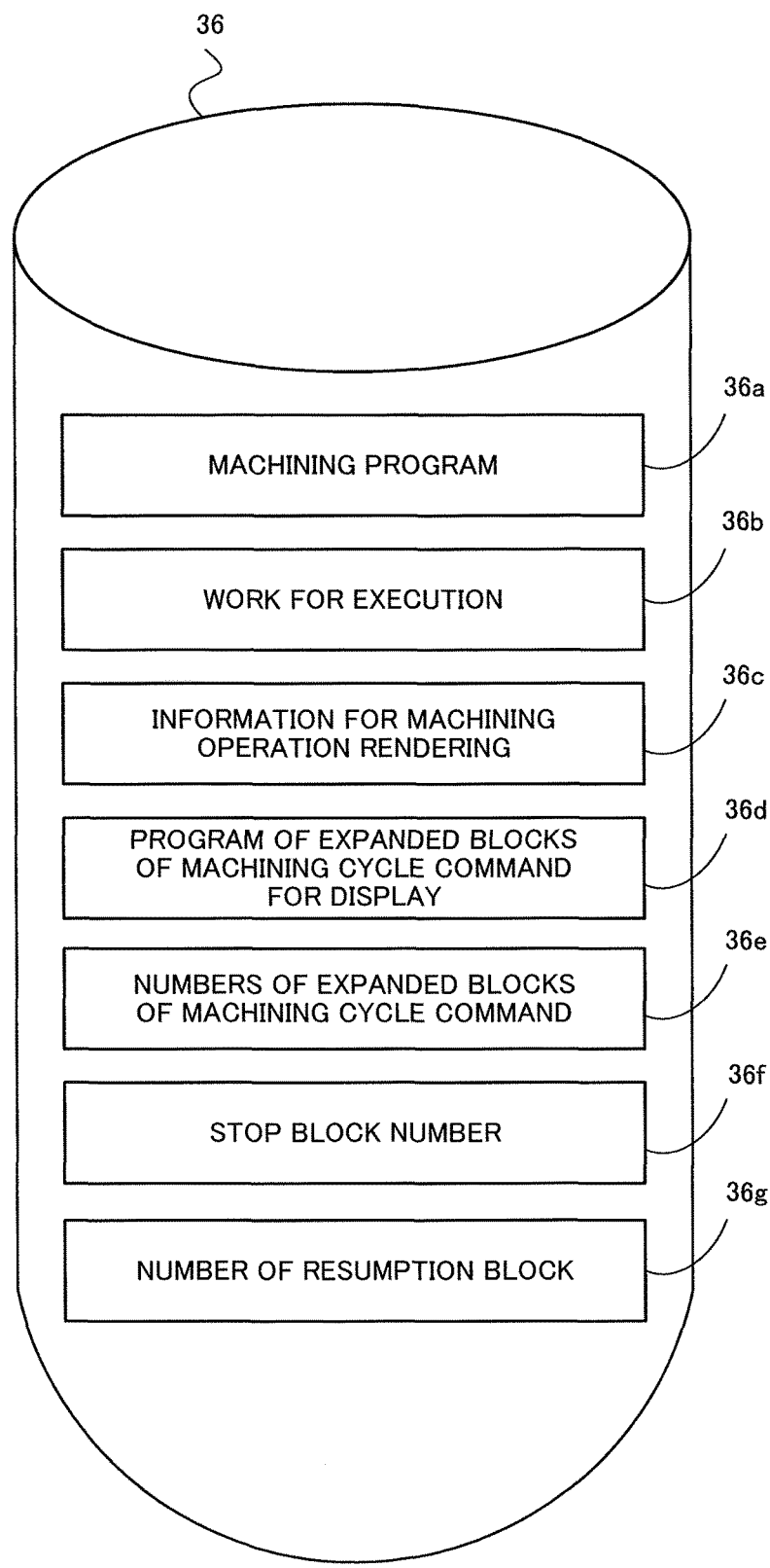
FIG. 14 is a diagram for explaining a data stored and a memory referred to in processing shown in the flowcharts of FIGS. 11A to 12C.

Processing by the operation unit 39 and the display unit 38 in the simulation apparatus 30 shown in FIG. 13 is explained according to steps of the flowcharts of FIGS. 11A and 11B.

[Step SA01] The operation unit 39 determines whether any key among the keys F1 to F7 shown in FIG. 13 is pressed or not. When any key is pressed (YES), the operation unit 39 shifts to step SA10. When no key is pressed (NO), the operation unit 39 shifts to step SA02.

[Step SA02] The display unit 38 determines whether a simulation is in a state of execution or not. When the simulation is in the state of execution (YES), the display unit 38 shifts to step SA03. When the simulation is not in the state of execution (NO), the display unit 38 returns to step SA01.

[Step SA03] The display unit 38 acquires machining moving image rendering information from the memory 36. The machining moving image rendering information is stored in the memory 36 according to processing in step SB14 of the flowchart of FIG. 12B explained below.

[Step SA04] The display unit 38 renders a machining operation in the first display area 101.

[Step SA05] The display unit 38 displays a machining program being executed in the second display area 102.

[Step SA06] The display unit 38 determines whether a machining cycle command flag is ON or OFF. When the machining cycle command flag is ON (YES), the display unit 38 shifts to step SA07. When the machining cycle command flag is OFF (NO), the display unit 38 returns to step SA01. The machining cycle command flag is ON when a machining cycle command is executed in the simulation. Otherwise, the machining cycle command flag is OFF. As explained below, the machining cycle command flag is ON in processing in step SB10 in the flowchart of FIG. 12B. On the other hand, the machining cycle command flag is OFF in processing in step SB17 in the flowchart of FIG. 12B and processing in step SB24 in the flowchart of FIG. 12C.

[Step SA07] The display unit 38 acquires, from a program 36d of expanded blocks of the machining cycle command for display, a program of expanded block being executed of the machining cycle command. A program of expanded blocks of the machining cycle command for display is stored in the memory 36 according to processing in step SB22. When the simulation state is stopped, information on the program of expanded blocks of the machining cycle command for display, stored in the memory 36, is deleted according to processing in step SB05.

[Step SA08] The display unit 38 displays, in the third display area 103, the program of the expanded blocks being executed acquired from the memory 36 in step SA07.

[Step SA09] The display unit 38 displays a cursor in one block being executed among the expanded blocks displayed in the third display area 103 and returns to step SA01.

[Step SA10] The operation unit 39 determines whether the start key F1 is pressed or not. When the start key F1 is pressed (YES), the operation unit 39 shifts to step SA14. When the start key F1 is not pressed (NO), the operation unit 39 shifts to step SA11.

[Step SA11] The operation unit 39 determines whether the pause key F2 is pressed or not. When the pause key F2 is pressed (YES), the operation unit 39 shifts to step SA15. When the pause key F2 is not pressed (NO), the operation unit 39 shifts to step SA12.

[Step SA12] The operation unit 39 determines whether the stop key F3 is pressed or not. When the stop key F3 is pressed (YES), the operation unit 39 shifts to step SA16. When the stop key F3 is not pressed (NO), the operation unit 39 shifts to step SA13.

[Step SA13] The operation unit 39 determines whether the simulation is in a pause state or not. When the simulation is in the pause state (YES), the operation unit 39 shifts to step SA17. When the simulation is not in the pause state (NO), the operation unit 39 returns to step SA02.

[Step SA14] The operation unit 39 changes the simulation to a state of execution.

[Step SA15] The operation unit 39 changes the simulation to the pause state.

[Step SA16] The operation unit 39 changes the simulation to a stop state.

[Step SA17] The operation unit 39 determines whether the machining cycle command flag is ON or OFF. When the machining cycle command flag is ON (YES), the operation unit 39 shifts to step SA18. When the machining cycle command flag is OFF (NO), the operation unit 39 returns to step SA02.

[Step SA18] The operation unit 39 determines whether the cursor moving key F6 for moving the cursor in the upward direction or the cursor moving key F7 for moving the cursor in the downward direction is pressed or not. When one of the keys is pressed (YES), the operation unit 39 shifts to step SA20. When none of the keys is pressed (NO), the operation unit 39 shifts to step SA19.

[Step SA19] The operation unit 39 determines whether the setting key F4, which is the function key for a stop block number, or the setting key F5, which is the function key for a resumption block number is pressed or not. When one of the keys is pressed (YES), the operation unit 39 shifts to step SA21. When none of the keys is pressed (NO), the operation unit 39 returns to step SA02.

[Step SA20] The operation unit 39 moves the cursor in the third display area 103 in a direction commanded by the cursor moving keys F6 and F7. As a cursor position, an arbitrary block can be selected according to key operation by the operator in the processing in step SA18.

[Step SA21] The operation unit 39 stores a block number of the cursor position in the third display area 103 in the memory 36 as a stop block number or stores a block number for re-execution of the simulation in the memory 36 as a resumption block number and returns to step SA02.

Figure 12A:
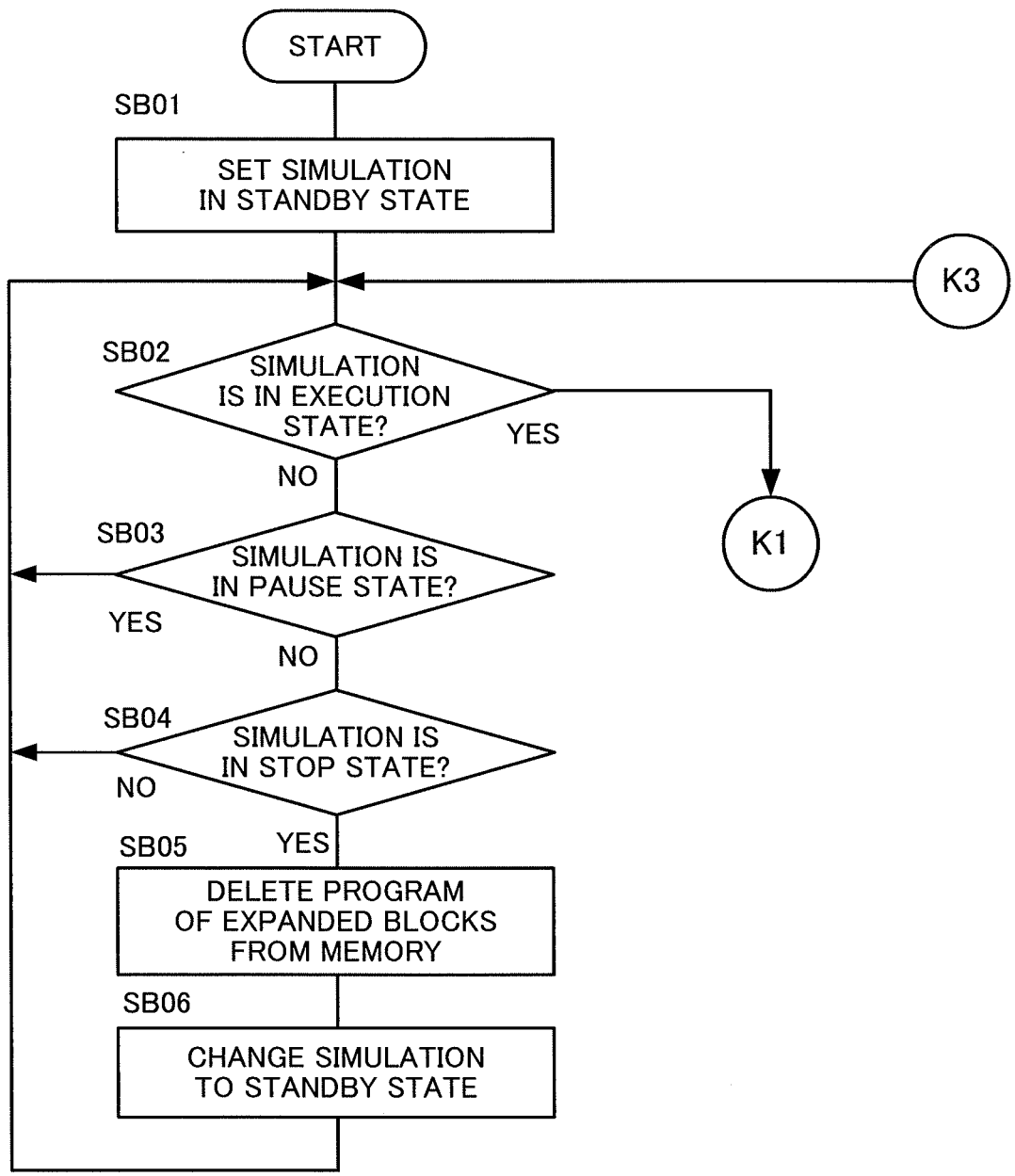
FIGS. 12A to 12C are flowcharts for explaining processing executed by an execution unit included in the simulation apparatus shown in FIG. 9.
Figure 12B:
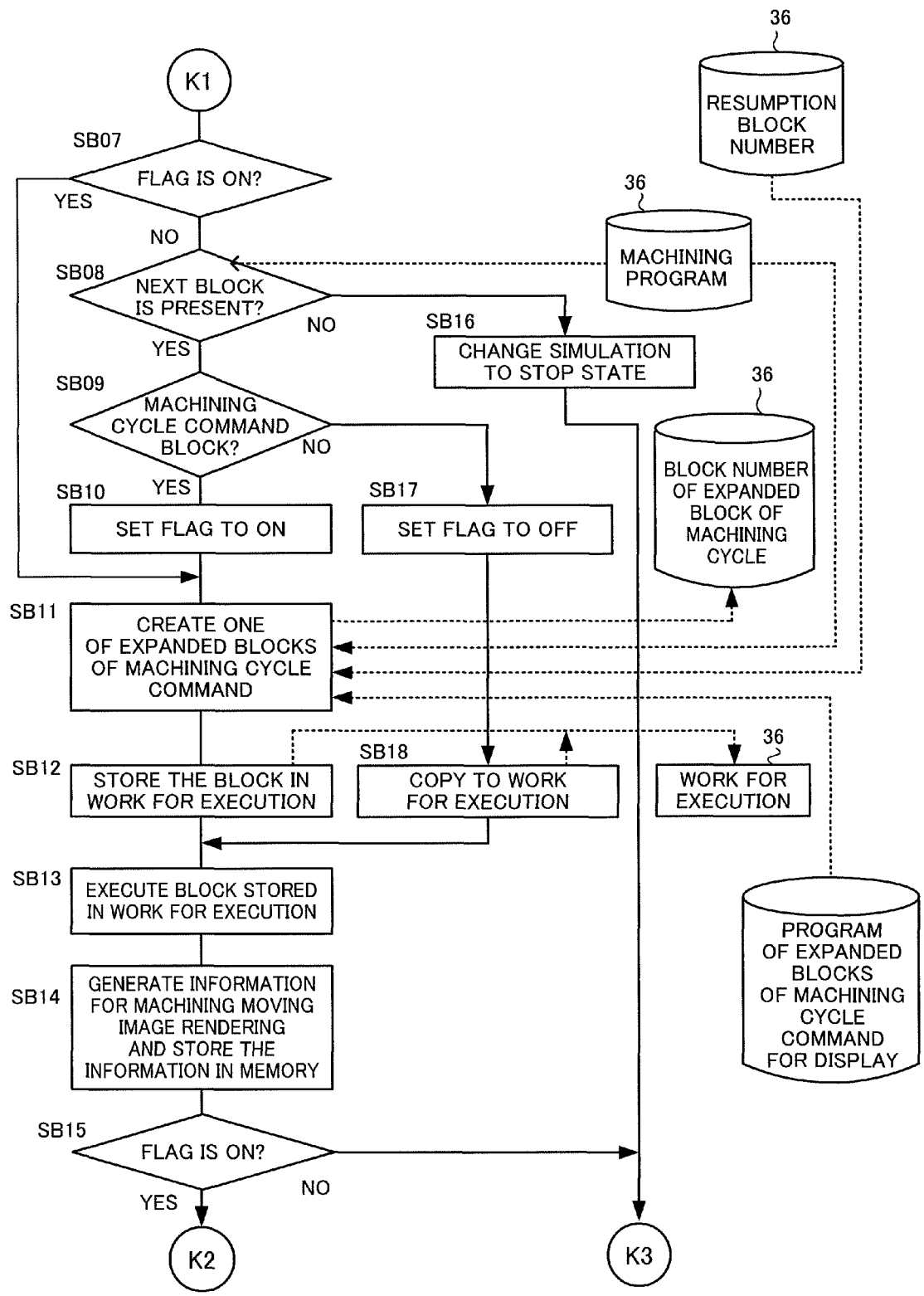
Figure 12C:
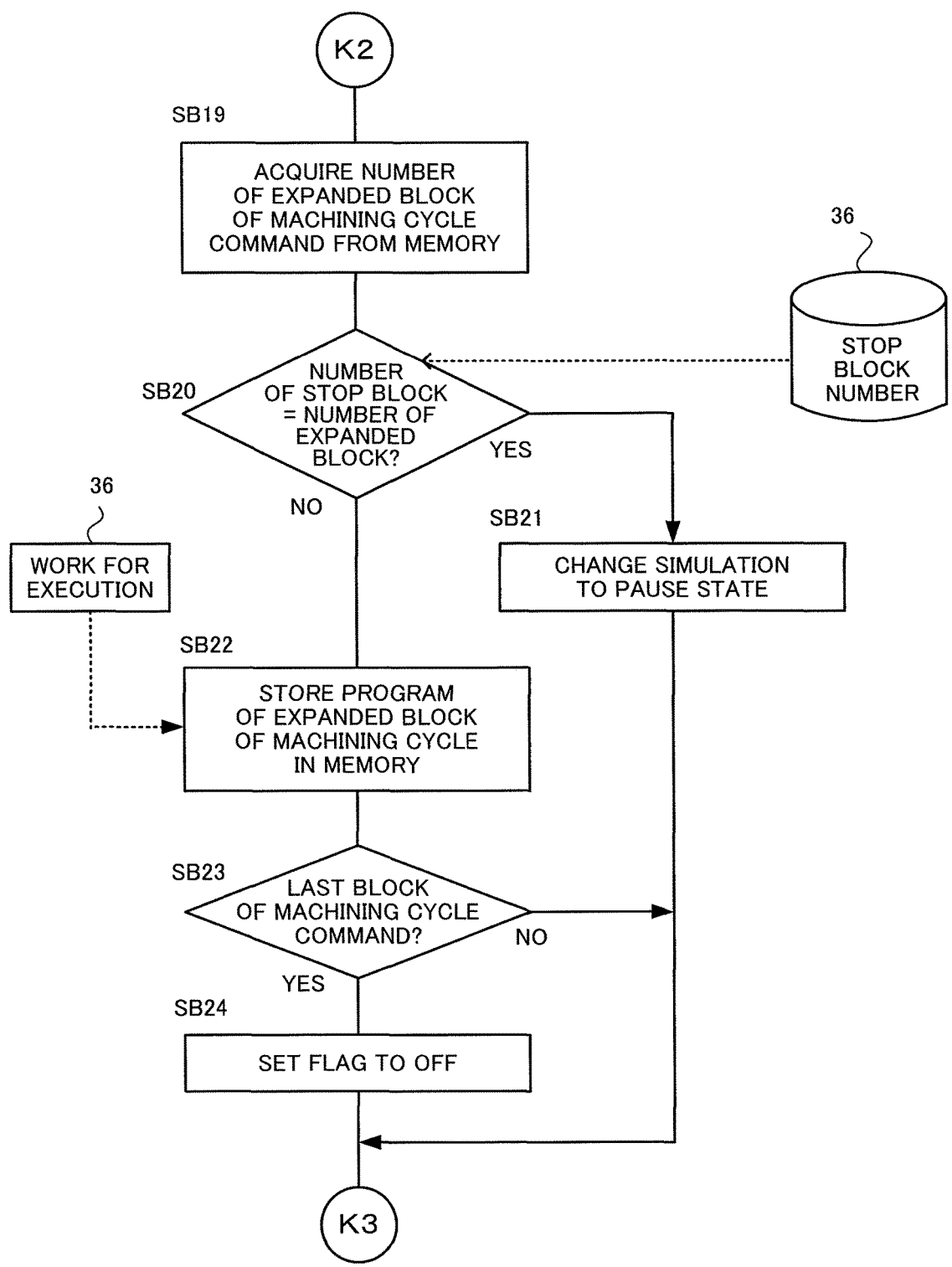

Processing by the execution unit 34 in the simulation apparatus 30 is explained according to steps of the flowcharts of FIGS. 12A to 12C.

[Step SB01] The execution unit 34 sets a simulation to a standby state. The standby state represents a state in which the simulation is completely stopped and can be immediately started.

[Step SB02] The execution unit 34 determines whether the simulation is in a state of execution or not. When the simulation is in the state of execution (YES), the execution unit 34 shifts to step SB07. When the simulation is not in the state of execution (NO), the execution unit 34 shifts to step SB03.

[Step SB03] The execution unit 34 determines whether the simulation is in a pause state or not. When the simulation is in the pause state (YES), the execution unit 34 returns to step SB02. When the simulation is not in the pause state (NO), the execution unit 34 shifts to step SB04.

[Step SB04] The execution unit 34 determines whether the simulation is in a stop state or not. When the simulation is in the stop state (YES), the execution unit 34 shifts to step SB05. When the simulation is not in the stop state (NO), the execution unit 34 returns to step SB02.

[Step SB05] The execution unit 34 deletes, from a storage area of the memory 36, the program 36d (FIG. 14) of the expanded blocks of the machining cycle command for display. Since it is determined in the processing in the preceding step SB04 that the simulation is in the stop state, data of the program 36d of the expanded blocks is unnecessary anymore. Therefore, the execution unit 34 deletes, for saving of the memory, the program of the expanded blocks of the machining cycle command for display stored in the memory 36.

[Step SB06] The execution unit 34 sets the simulation in the standby state and returns to step SB02.

[Step SB07] The execution unit 34 determines whether a machining cycle command flag is ON or OFF. When the machining cycle command flag is ON (YES), the execution unit 34 shifts to step SB11. When the machining cycle command flag is OFF (NO), the execution unit 34 shifts to step SB08. The default of the machining cycle command flag is OFF.

[Step SB08] The execution unit 34 determines whether the next block to be simulated next is present or not in the machining program. When the next block is present in the machining program (YES), the execution unit 34 shifts to step SB09. When the next block is absent in the machining program (NO), the execution unit 34 shifts to step SB16. The absence of the next block to be simulated means that the simulation ends to the last block of the machining program.

[Step SB09] The execution unit 34 reads the (next) block in the machining program and determines whether the read block is a machining cycle command or not. When the read block is the machining cycle command (YES), the execution unit 34 shifts to step SB10. When the read block is not the machining cycle command (NO), the execution unit 34 shifts to step SB17. It is possible to determine whether or not the read block is the machining cycle command according to, for example, a G code designated in the block.

[Step SB10] The execution unit 34 sets the machining cycle command flag to ON.

[Step SB11] The execution unit 34 creates, from a plurality of blocks included in the machining cycle command, one expanded block and also creates a number of the expanded block and stores the number in the memory 36 as a block number. Two kinds of processing in re-executing the simulation are explained below.

One kind of processing is a method of using a resumption block number. First, the execution unit 34 acquires a resumption block number 36g stored in the memory 36. Then, the execution unit 34 acquires, on the basis of the acquired resumption block number 36g, information concerning a relevant block from the program of the expanded blocks of the machining cycle command for display to create one block.

The other kind of processing is processing for re-executing the simulation from a cursor position in the third display area 103. The execution unit 34 creates one block from information concerning the present cursor position and the program of the expanded blocks of the machining cycle command for display.

Further, processing for creating the next one block of the block for which the simulation is resumed is additionally explained. The execution unit 34 sequentially repeats the creation of one block referring to information concerning blocks stored in the program of the expanded blocks of the machining cycle command for display until there is no more information to be referred to. When there is no more information concerning the blocks to be referred to, again, the execution unit 34 creates, from the plurality of blocks included in the machining cycle command, one expanded block of the machining cycle command. In the re-execution of the simulation, while the program of the expanded blocks of the machining cycle command for display is executed, creation and storage of a number of the expanded block of the machining cycle command are not performed.

[Step SB12] The execution unit 34 stores, in "work for execution", one block of the expanded blocks of the machining cycle command created in step SB11. The "work for execution" is a temporary storage memory used during execution of the simulation. The capacity of the work for execution is equivalent to only one block. When the next block is executed, information concerning the preceding one block is overwritten.

[Step SB13] The execution unit 34 executes the one block stored in the work for execution.

[Step SB14] The execution unit 34 generates information for machining operation rendering 36c (FIG. 14) and stores the information for machining operation rendering 36c in the memory 36.

[Step SB15] The execution unit 34 determines whether the machining cycle command flag is ON or OFF. When the machining cycle command flag is ON (YES), the execution unit 34 shifts to step SB19. When the machining cycle command flag is OFF (NO), the execution unit 34 returns to step SB02.

[Step SB16] The execution unit 34 changes the simulation to the stop state and returns to step SB02.

[Step SB17] The execution unit 34 sets the machining cycle command flag to OFF.

[Step SB18] The execution unit 34 copies information equivalent to one block of the machining program to the work for execution (the memory 36) and shifts to step SB13.

[Step SB19] The execution unit 34 acquires, from the memory 36, a number 36e (FIG. 14) of the block currently being executed among the expanded blocks of the machining cycle command. The number 36e of the block currently being executed is stored in the memory 36 in the processing in step SB11.

[Step SB20] The execution unit 34 determines whether a block number 36f (FIG. 14) of the stop block stored in the memory 36 and the number 36e of the expanded block of the machining cycle command acquired in step SB19 are equal or not. When the block numbers are equal (YES), the execution unit 34 shifts to step SB21. When the block numbers are not equal (NO), the execution unit 34 shifts to step SB22.

[Step SB21] The execution unit 34 changes the simulation to the pause state and returns to step SB02.

[Step SB22] The execution unit 34 acquires the program of the expanded blocker of the machining cycle command from the work for execution (the memory 36) and stores the program 36d in the memory 36 as a program of the expanded blocks of the machining cycle command for display. The execution unit 34 continues to store the program of the expanded blocks of the machining cycle command for display until the machining cycle command currently being executed ends. When the machining cycle command ends, the memory of the program of the expanded blocks of the machining cycle command for display is deleted according to the processing in step SB05.

[Step SB23] The execution unit 34 determines whether the expanded block is the last block of the machining cycle command or not. When the expanded block is the last block (YES), the execution unit 34 shifts to step SB24. When the expanded block is not the last block yet (NO), the execution unit 34 returns to step SB02. The determination concerning whether the expanded block is the last block of the machining cycle command or not is performed when an expanded block of the machining cycle command is not created in step SB11.

[Step SB24] The execution unit 34 sets the machining cycle command flag to OFF and returns to step SB02.

The simulation apparatus according to the present invention can include the operation unit 39 (FIG. 9) configured to designate any one of the movement commands included in the machining cycle command displayed on (the third display area of) the image displaying device 37. The execution unit 34 can invoke a movement command designated by the operation unit 39 and a movement command following the movement command from among the series of movement commands stored in the memory 36 and execute the invoked movement commands. The function of the operation unit 39 (the function for acquiring a resumption block number) corresponds to steps SA18 to SA21. The function of the execution unit 34 corresponds to steps SB11 to SB14. The execution unit 34 can stop the execution of the series of movement commands stored in the memory 36 at a spot of the movement command designated by the operation unit 39. The function of the operation unit 39 (the function for acquiring a stop block number) corresponds to steps SA18 to SA21. The function of the execution unit 34 corresponds to steps SB20 to SB21.

FIG. 13 is a diagram showing a display area displayed in the processing flow shown in FIGS. 11A and 11B. The screen configuration 100 displayed on the screen of the image displaying device 37 of the simulation apparatus 30 includes the first display area 101, the second display area 102, and the third display area 103. In the image displaying device 37, the function keys F1 to F2 for inputting various commands are arranged.

FIG. 14 is a diagram for explaining the memory of the simulation apparatus in which data is stored or referred to in the processing flow shown in FIGS. 11A to 12C. The memory 36 of the simulation apparatus 30 shown in FIG. 9 includes a storing unit 36a for storing a machining program, a storing unit 36b for storing a work for execution, a storing unit 36c for storing an information for machining operation rendering, a storing unit 36d for storing a program of expanded blocks of a machining cycle command for display, a storing unit 36e for storing block numbers of the expanded blocks of the machining cycle command, a storing unit 36f for storing a stop block number, and a storing unit 36g for storing a resumption block number. The processing of the flowcharts of FIGS. 11A to 12C is executed, whereby information is stored in the storing units 36a, 36b, 36c, 36d, 36e, 36f, and 36g of the memory 36, the stored information is read out, and unnecessary information is deleted.

What is claimed is:

1. A computer-implemented simulation apparatus of a numerical controller that controls a movable unit of a machine tool on the basis of a machining program, the machining program including a machining cycle command for generating a series of movement commands from designated work shape data and machining conditions, the simulation apparatus comprising:
an image displaying device;
an execution unit configured to analyze the machining program and, when a command of the analyzed machining program is a machining cycle command, sequentially generate movement commands for the movable unit from the designated work shape data and machining conditions;

a memory configured to store the series of movement commands generated by the execution unit; and a display unit configured to display a moving image of the machining operation based on the movement commands of the movable unit generated by the execution unit in the first display area, the machining program including a machining cycle command in the second display area, and the series of movement commands generated from the machining cycle command by the execution unit in the third display area, wherein the simulation apparatus is configured to display the series of movement commands generated by the execution unit in the third display area of the image displaying device, display a moving image of a machining operation based on the movement commands of the movable unit generated by the execution unit in the first display area, and, same time, store the movement commands generated by the execution unit, displayed in the third display area, and wherein the execution unit is configured to invoke any one of the stored series of movement commands displayed in the third display area, and to execute the invoked movement commands.

2. The computer-implemented simulation apparatus of the numerical controller according to claim 1, further comprising an operation unit configured to designate any one or more of the series of movement commands displayed in the third display area of the image displaying device, wherein the execution unit stops the execution of the series of movement commands stored in the memory at a spot of the movement command designated by the operation unit.

* * * * *